United States Patent [19]

Campbell

[11] Patent Number: 4,974,284
[45] Date of Patent: Dec. 4, 1990

[54] PICNIC TABLE CASTER ASSEMBLY

[75] Inventor: John Campbell, Waterloo, Canada

[73] Assignee: Faultless-Doerner Manufacturing Inc., Waterloo, Canada

[21] Appl. No.: 477,758

[22] Filed: Feb. 9, 1990

[30] Foreign Application Priority Data

Feb. 17, 1989 [CA] Canada ................................. 591477

[51] Int. Cl.⁵ ............................................ B60B 33/00
[52] U.S. Cl. ............................................ 16/29; 16/30; 16/31 A; 16/40; 297/157
[58] Field of Search .................. 16/18 A, 18 R, 31 A, 16/31 R, 29, 30, 32, 34, 100; 108/99, 112, 113; 248/129; 280/47.131; 297/157, 159

[56] References Cited

U.S. PATENT DOCUMENTS

| | | | |
|---|---|---|---|
| 691,532 | 1/1902 | Clark | 16/30 |
| 2,512,473 | 6/1950 | Alch | 297/159 |
| 4,133,271 | 1/1979 | Carlson | 108/113 |
| 4,424,604 | 1/1984 | Dupuis | 16/29 |

Primary Examiner—Richard K. Seidel
Assistant Examiner—Edward A. Brown
Attorney, Agent, or Firm—Fetherstonhaugh & Co.

[57] ABSTRACT

A wheel assembly and a picnic table with the wheel assembly attached thereto includes a bracket which has an arm portion and a mounting flange portion. The mounting flange portion is inclined at an angle of about 65° with respect to the longitudinal extent of the upper edge of the arm portion. The flange portion is attached to inner face of the leg of the article of furniture such that the wheel which is located at the distal end of the arm portion is in close proximity to the underlying support surface. When attached to the leg of the article of furniture, the wheel is aligned with a side edge of the leg so that it does not form an obstruction which would be encountered by the legs of a person seated on the furniture in use.

2 Claims, 2 Drawing Sheets

PICNIC TABLE CASTER ASSEMBLY

BACKGROUND OF THE INVENTION

This invention relates to a wheel assembly for outdoor furniture and wheeled outdoor furniture.

A wheel kit for outdoor furniture is described in Canadian patent No. 1,091,872 dated Dec. 23, 1980 and issued to Emanuel F. Dupuis. In this device, the wheel mounting bracket is a complex bracket which has a mounting channel which receives the lower end of the legs and an end flange which is attached to the outer side face of the legs of the article of furniture. The wheels are arranged to project outwardly from the outer side faces of the legs of the article of furniture so that a picnic table, for example, is lifted at one end in order to transfer the weight onto the wheels.

This bracket structure is expensive to manufacture. In addition, because it is arranged to extend from a side face of the leg of the picnic table, it forms an obstruction which is likely to be encountered by the feet of a user seated at the table.

SUMMARY OF THE INVENTION

The wheel assembly of the present invention is simple and inexpensive to manufacture and install and when attached to a picnic table, it is aligned with the legs of the table so that it does not form an obstruction likely to be encountered by the feet of a person seated at the table.

According to one aspect of the present invention, there is provided a wheel assembly for outdoor furniture comprising a bracket having an arm portion and a mounting flange portion, said arm portion having a proximal end and a distal end and longitudinally extending inner and outer side faces extending from the proximal end to the distal end and an upper edge and a lower edge, a flange portion projecting laterally from the inner side face of the arm portion at right angles thereto, said flange portion being angularly inclined with respect to the longitudinal extent of the arm portion so as to be downwardly and forwardly inclined at an angle of about 25° with respect to the direction of the longitudinal extent of the arm portion, a wheel mounted for rotation at the distal end of the arm portion about an axis which extends parallel to the flange portion, the wheel being located on the inner side face of the arm portion so as to be aligned with the flange portion and spaced therefore by an amount sufficient to permit the flange and wheel to be located on opposite sides of a leg of a piece of outdoor furniture on which the bracket is mounted in use.

According to yet another aspect of the present invention, there is provided a picnic table comprising a table having a pair of legs at each end thereof, each pair of legs consisting of first and second legs which diverge downwardly from a tabletop toward first and second sides of the tabletop respectively, at an angle in the range of about 30° to 60°, each leg of each pair of legs having a front face, a back face, an inner side face and an outer side face defining a rectangular cross-sectional configuration in which the side faces are wider than the front and back faces, a wheel mounting bracket for each first leg, each wheel mounting bracket comprising an arm portion and a mounting flange portion, said arm portion having a proximal end and a distal end and longitudinally extending inner and outer side faces extending from the proximal end to the distal end and an upper edge and lower edge, a flange portion projecting laterally from the inner side face of the arm portion at right angles thereto, said flange portion being angularly inclined with respect to the longitudinal extent of the arm portion so as to be downwardly and forwardly inclined at an angle of about 25° with respect to the direction of the longitudinal extent of the arm portion, said wheel mounting bracket being secured to each first leg adjacent the lower end thereof with said flange portion arranged in a face-to-face relationship with said back face and said inner side face of said arm portion in a face-to-face relationship with one of said side faces of said first leg such that the distal end portion of the arm projects outwardly from the front face of the leg on which it is mounted, a wheel mounted for rotation adjacent the distal end of said arm portion on the same side of the arm portion as the flange so as to be aligned with said flange portion, said bracket being mounted adjacent the lower end of each first leg such that when the side of the table opposite that at which the wheels are located is raised, the entire weight of the table will be transferred to the wheels such that the picnic table may be wheeled across the surface on which it is located.

BRIEF DESCRIPTION OF THE DRAWINGS

The invention will be more clearly understood after reference to the following detailed specification read in conjunction with the drawings wherein.

DESCRIPTION OF PREFERRED EMBODIMENT

Figure 2:
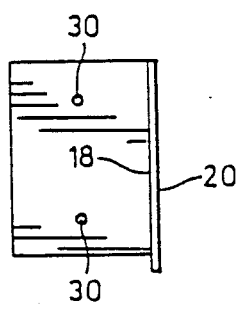
FIG. 2 is an end elevation of the augmenting bracket of FIG. 1.
Figure 1:
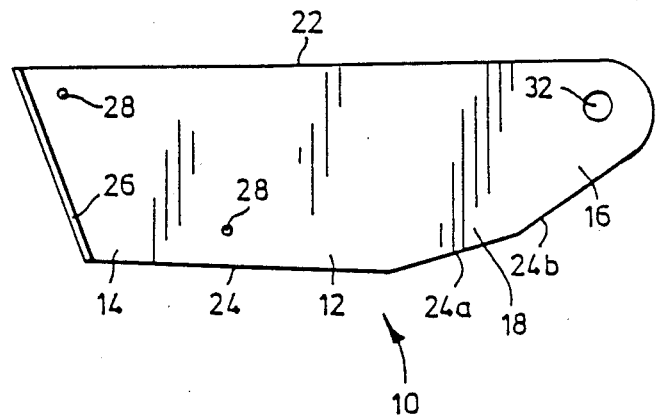
FIG. 1 is a side elevation of a leg mounting bracket constructed in accordance with an embodiment of the present invention.

With reference to FIG. 1 of the drawings, the reference numeral 10 refers generally to a wheel mounting bracket constructed in accordance with an embodiment of the present invention. The bracket 10 has an arm portion 12 which has a proximal end 14 and a distal end 16. The arm portion 12 also has an inner side face 18 and an outer side face 20. The arm portion 12 also has a straight upper edge 22 and a lower edge 24 which has inclined Sections 24a and 24b which extend toward the distal end. The bracket 10 also has a flange portion 26 which extends at right angles to the arm portion 12. The flange portion 26 is angularly inclined at an angle of about 65° to the upper edge 22 so as to be downwardly and forwardly inclined with respect to the direction of the longitudinal extent of the arm portion. Leg mounting passages 28 are formed in the arm portion and leg mounting passages 30 are formed in the flange portion. A wheel mounting passage 32 is formed in the arm portion adjacent the distal end thereof.

Figure 3:
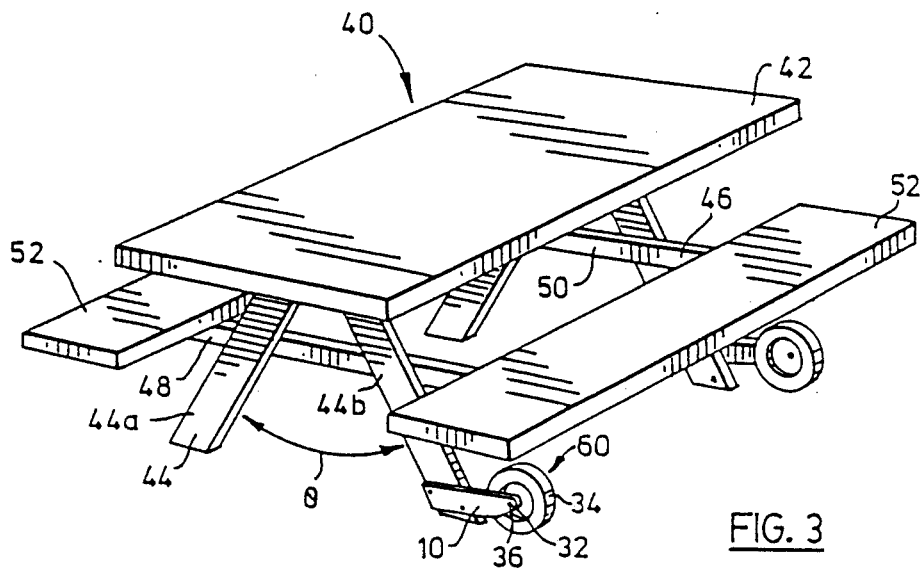
FIG. 3 is a pictorial end view of a picnic table having wheels mounted thereon in accordance with an ambodiment of the present invention.

As shown in FIG. 3, a wheel 34 is mounted on a shaft 36 which is mounted in the mounting passage 32. The wheel is mounted so that its side face is located in a face-to-face relationship with the inner side face 18 of the arm so that it is located on the same side of the arm portion 12 as the flange 26 with the result that it is aligned with the flange 26.

Figure 4:
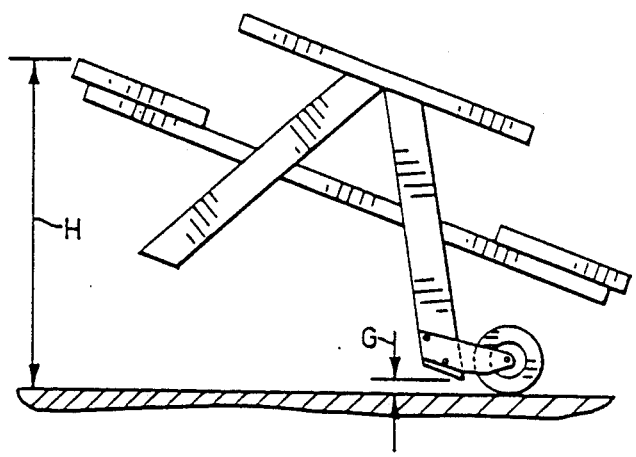
FIG. 4 is an end view of the table of FIG. 3 in an elevated position for movement.
Figure 5:
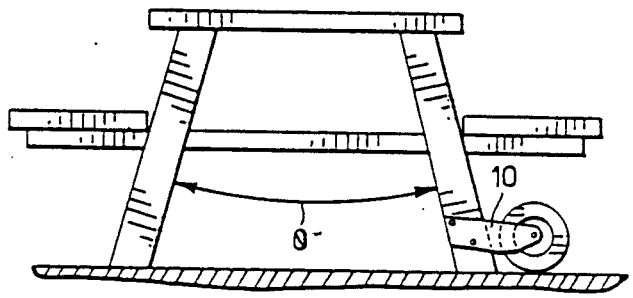
FIG. 5 is an end view of a table in which the legs diverge at a different angle from those of FIG. 3.
Figure 6:
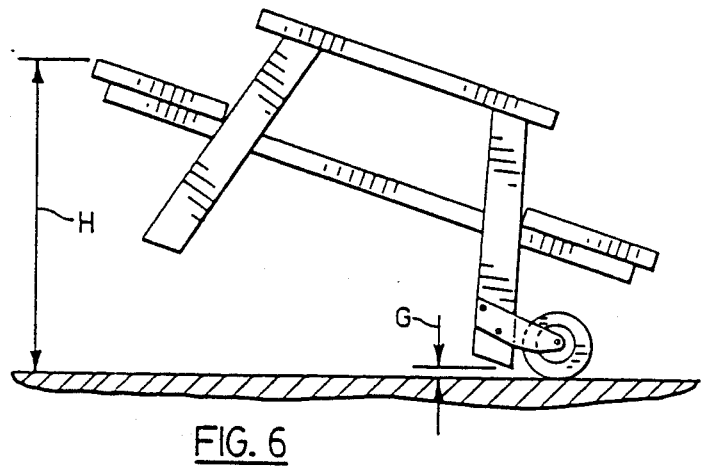
FIG. 6 is an end view of the table of FIG. 5 elevated for movement.

A picnic table is illustrated in FIGS. 3 and 4 of the drawings and is generally identified by the reference numeral 40. The picnic table 40 has a tabletop 42. A first pair of legs 44 extends downwardly from one end of the tabletop and a second pair of legs 46 extends downwardly from the outer end of the tabletop. The legs 44 are maintained in a spaced relationship by means of a crossbar 48 and the legs are connected to the cross bar 50. Bench boards 52 extend between the crossbars 48 and 50. This type of table is well known, however, the angle θ which is formed between the diverging legs varies according to the table design as shown when comparing FIGS. 3 and 5 between about 30° and about 60°. The wheel mounting assembly which is generally identified by the reference numeral 60 in FIG. 3 and which includes the wheel mounting bracket 10 and the wheel 34, may be used in combination with the legs of either table construction. As shown in FIG. 3, each leg 44 has a rectangular cross-sectional configuration. The inner and outer side faces of each leg are wider than the front and back faces. The legs are generally made from 2'×4' wooden studs.

The wheel bracket 10 is secured to the outer side face of the legs by mounting screws which extend through the leg mounting passages 28. The flange portion 26 is secured to the back face of the leg 44 by mounting screws which extend through the mounting passages 30. As a result, the flange 26 is located in a face-to-face relationship with respect to the back face of each leg and the angle of inclination of the bracket 10 with respect to the horizontal is determined by the angle of inclination of the back face of the leg 44. The legs are positioned so that the wheel 44 will not support any substantial amount of the weight of the table when the table is resting on the legs. It will be noted, however, that the wheels 34 are located on the inner face of the brackets 10 and are therefore aligned with the legs 44. As a result, the wheels do not form any greater obstruction to the feet of a person seated on the bench 52 than do the legs 44. In addition, because the wheels are arranged to extend outwardly toward one side of the table rather than outwardly toward an end of the table, the height to which the other side of the table must be elevated in order to ensure that the legs clear the ground is less than that which is required if the legs are arranged to extend forwardly from an end of the table.

A typical mounting bracket is formed from sheet steel and has a sheet thickness of about 3/16". The width of the flange is about 1½" and the length of the flange is about 3". The height of the bracket is about 2⅞" and the length of the upper edge is about 8¾". The wheel mounting passage 32 is preferably located about 7⅞" from the proximal end of the upper edge of the arm. The diameter of the wheel mounting passage 32 is preferably about ⅜". The diameter of the wheel 34 is preferably 6". The end portion 24a of the arm tapers to a height of about 2" in the plane which extends vertically through the axis of the passage 32 when the upper edge 22 is horizontally located. Because the distal end of the arm is substantially smaller than the wheel, this edge of the wheel will project beyond the arm over a major arc and this ensures that the bracket is effective when the angle θ is in the range of 30° to 60°. The mounting passage 32 is preferably ⅜" in diameter and is located ⅜" below the upper edge 24 and concentrically with the 1¼" radius of the distal end.

With this structure, it is only necessary to lift the side of the conventional picnic bench 52 which is remote from the wheel assembly to a height H of 30" in order to achieve close to 1" ground clearance G.

It will be apparent that the wheel mounting bracket and wheel assembly may be mounted on other articles of furniture such as chairs, although it is particularly suitable for picnic tables which are usually heavy and difficult to move over rough terrain.

From the foregoing, it will be apparent that the present invention provides a simple and inexpensive mounting bracket and wheel assembly for outdoor furniture and a wheeled picnic table which is simple to assemble and transport.

The embodiments of the invention in which an exclusive property or privilege is claimed are defined as follows:

1. A wheel assembly for outdoor furniture comprising;
    a bracket having an arm portion and a mounting flange portion, said arm portion having a proximal end and a distal end and longitudinally extending inner and outer side faces extending from the proximal end to the distal end and an upper edge and a lower edge, said mounting flange portion extending at 90° from the inner side face of the arm portion at right angles thereto, said mounting flange portion being angularly inclined with respect to the longitudinal extent of the side faces of the arm portion so as to be inclined downwardly from the upper edge toward the distal end of the arm portion at an angle of about 65° with respect to the upper edge of the arm portion, and passage means opening through the arm portion and the mounting flange portion for use when attaching the assembly to a leg of an item of outdoor furniture,
    a wheel mounted for rotation at the distal end of the arm porion about an axis which extends parallel to the flange portion, the wheel being located on the inner side face of the arm portion so as to be aligned with the flange portion and spaced therefrom by an amount sufficient to permit the flange and wheel to be located on opposite sides of a leg of a piece of outdoor furniture on which the bracket is mounted in use.

2. A wheeled picnic table comprising a table having a pair of legs at each end thereof, each pair of legs consisting of first and second legs which diverge downwardly from a tabletop toward first and second sides of the tabletop respectively, at an angle in the range of about 60° to 120° with respect to one another, each leg of each pair of legs having a front face, a back face, an inner side face and an outer side face defining a rectangular cross-sectional configuration in which the side faces are wider than the front and back faces, a wheel mounting bracket for each first leg, each wheel mounting bracket comprising,
    an arm portion and a mounting flange portion, said arm portion having a proximal end and a distal end and longitudinally extending inner and outer side faces extending from the proximal end to the distal end and an upper edge and a lower edge, a flange portion projecting laterally from the inner side face of the arm portion at right angles thereto, said flange portion being angularly inclined with respect to the longitudinal extent of the side faces of the arm portion so as to be inclined downwardly from the upper edge of the arm toward the distal end of the arm at an angle of about 65° with respect to the direction of the longitudinal extent of the upper edge of the arm portion, said wheel mounting bracket being secured to each first leg adjacent the lower end thereof with said flange portion arranged in a face-to-face relationship with said back face and said inner side face of said arm portion in a face-to-face relationship with one of said side faces of said first leg such that the distal end portion of the arm projects outwardly from the front face of the leg on which it is mounted, a wheel mounted for rotation adjacent the distal end of said arm portion on the same side of the arm portion as the flange so as to be aligned with said flange portion, said bracket being mounted adjacent the lower end of each first leg such that when the side of the table opposite that at which the wheels are located is raised, the entire weight of the table will be transferred to the wheels such that the picnic table maybe wheeled across the surface on which it is located.

* * * * *